(12) United States Patent  (10) Patent No.: US 7,645,134 B2
Jackson et al.  (45) Date of Patent: Jan. 12, 2010

(54) RIBBON WOUND ROLL

(75) Inventors: Byron M. Jackson, Forest Lake, MN (US); Ronald W. Ausen, St. Paul, MN (US); Mark S. Behrens, Lindstrom, MN (US); Timothy P. Pariseau, Forest Lake, MN (US)

(73) Assignee: 3M Innovative Properties Company, Saint Paul, MN (US)

( * ) Notice: Subject to any disclaimer, the term of this patent is extended or adjusted under 35 U.S.C. 154(b) by 81 days.

(21) Appl. No.: 11/612,739

(22) Filed: Dec. 19, 2006

(65) Prior Publication Data

US 2008/0145470 A1  Jun. 19, 2008

(51) Int. Cl.
*B29C 43/46* (2006.01)

(52) U.S. Cl. .................. 425/471; 425/363; 492/35; 492/44

(58) Field of Classification Search .............. 425/363, 425/471; 492/35, 44
See application file for complete search history.

(56) References Cited

U.S. PATENT DOCUMENTS

| 2,793,585 | A | * | 5/1957 | Granitsas ................. 492/35 |
| 3,192,589 | A | | 7/1965 | Pearson |
| 3,312,583 | A | * | 4/1967 | Rochlis ................. 425/373 |
| 3,594,863 | A | | 7/1971 | Erb |
| 4,110,152 | A | * | 8/1978 | Dunning et al. .......... 425/374 |
| 4,775,310 | A | * | 10/1988 | Fischer ................. 425/363 |
| 4,953,264 | A | | 9/1990 | Hollingsworth |
| 5,077,870 | A | | 1/1992 | Melbye |
| 5,554,333 | A | | 9/1996 | Fujiki |
| 5,620,769 | A | | 4/1997 | Wessels |
| 5,792,411 | A | | 8/1998 | Morris |
| 5,845,375 | A | | 12/1998 | Miller |
| 5,900,350 | A | * | 5/1999 | Provost et al. ............ 264/219 |
| 6,190,594 | B1 | | 2/2001 | Gorman |
| 6,524,507 | B1 | * | 2/2003 | Clune .................. 425/363 |
| 6,767,202 | B2 | | 7/2004 | Gorman |
| 6,800,234 | B2 | | 10/2004 | Ferguson |
| 6,902,389 | B2 | | 6/2005 | Gorman |
| 6,960,314 | B2 | * | 11/2005 | Lacey et al. ............. 264/167 |
| 7,214,334 | B2 | * | 5/2007 | Jens et al. ............... 425/471 |

FOREIGN PATENT DOCUMENTS

| JP | 08-034550 | 2/1996 |
| JP | 2005-231896 | 9/2005 |
| KR | 2003-0028719 | 4/2003 |
| WO | WO 97/46129 | 12/1997 |

* cited by examiner

*Primary Examiner*—James Mackey (57) ABSTRACT

There is provided a tool roll with a cylindrical base and a first ribbon having an inner face, an outer face, and first and second major sides located therebetween. The outer face of the first ribbon includes a plurality of depressions or holes formed therein and the first ribbon is wound in helical coils around the base roll such that the inner face is proximate the base roll. The plurality of depressions or holes in the outer face of the first ribbon form a plurality of discrete mold cavities with each of the discrete mold cavities including a mold opening at the outer face of the first ribbon.

24 Claims, 7 Drawing Sheets

RIBBON WOUND ROLL

FIELD OF THE INVENTION

The present invention relates to the field of manufacturing articles with structured surfaces. More particularly, the present invention provides tooling for manufacturing articles with one or more structured surfaces, methods of manufacturing the tooling, and methods of using the tooling to manufacture articles with one or more structured surfaces.

BACKGROUND OF THE INVENTION

Articles with one or more structured surfaces find a variety of uses. The articles may be provided as films that exhibit, e.g., increased surface area, structures used to provide a mechanical fastener, optical properties, etc. When these films are manufactured for use as mechanical fasteners, the protrusions that are found on the structured surface are commonly referred to as hooks. The hooks may be formed directly as hooks such as in a curved shape or they may be formed as hook precursors such as substantially upright stems that are deformed at the top such as into the shape of a mushroom. Such a mechanical fastener is shown in U.S. Pat. No. 3,192,589 (Pearson) which calls their fasteners "hermaphroditic" because the headed studs have both male and female characteristics when intermeshed. The Pearson fasteners can be made by molding a base from which integral headless studs project and then heat softening the tips of the studs.

U.S. Pat. No. 5,077,870 (Melbye et al.) discloses one method of manufacturing the hook strip portion of a mechanical fastener by forcing molten material into cavities formed in a moving mold surface. The stems formed by the moving mold surface are then capped to form the desired fasteners. The cavities are formed in the mold surface by drilling. As a result, the cavities are cylindrical in shape and, although some precision can be obtained in depth, diameter and spacing between cavities, it is obtained with some difficulty and increased costs. Furthermore, damage to the mold surface typically requires that the entire mold be discarded. U.S. Pat. No. 5,792,411 (Morris et al.) discloses a molding tool manufactured by laser machining a mold surface. Molten material is then forced into the cavities in the moving mold surface to form stems. The stems are then capped to form the desired fasteners. Because the cavities are formed by laser ablation, the cavity shape is based on the energy distribution within the laser beam used to form the cavities. Furthermore, precise control over the depth of the cavities is difficult to obtain due to variability in the material used to construct the mold, the power of the laser beam, the energy distribution within the beam, beam focus, etc.

U.S. Pat. No. 4,775,310 (Fischer) and PCT Publication No. WO 97/46129 (Lacey et al.) disclose tooling used to manufacture hook strips for a hook-and-loop style mechanical fastener. The tools are formed by a hollow drum with a water cooling jacket. A series of mold disks or alternating mold disks and spacer plates are laminated together along the length of the drum to form the desired mold cavities on the face of the roll. Disadvantages of these designs include the cost of manufacturing the mold disks with adequate precision to ensure that the mold cavities are of the same depth, length, spacing, etc. Size limitations imposed on the disks by manufacturing difficulties can, in turn, limit line speed in processes using the tools. Other disadvantages of this design include non-uniform cooling of the mold cavities, non-uniformities in the products produced by the stacked plates, etc.

U.S. Pat. No. 6,902,389 proposes tool rolls constructed of a cylindrical base roll wrapped with one or more continuous wires in a helical pattern. The wires are used to form a structured surface on the tool roll that is the negative of the structured surface to be formed on the articles processed using the tool roll. In one embodiment, at least one of the wires wound around the base roll may include depressions formed therein that, when wound in helical coils about the base roll, form mold cavities on the outer surface of the tool roll. The depressions are generally formed on the sides of the wires such that the last side of the depression forming the mold cavity is the opposite side on an adjacent wire wound around the base roll. The '389 roll and method is easier to form and lower cost than mold disks, but require winding long lengths of one or more wires under tension.

SUMMARY OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes. Alternatively, discrete articles may be processed using the tool rolls of the present invention.

By "structured surface" it is meant that a surface of the article deviates from a planar or other smooth surface. For example, the structured surface may include protrusions extending therefrom, such as stems used in connection with mechanical fasteners. Other alternative structured surfaces include, but are not limited to: continuous grooves or ridges, elongated structures, etc.

The tool rolls of the present invention are constructed of a cylindrical base, which can be a roll or cylinder, and are wrapped with one or more continuous ribbons in a helical pattern. The ribbons are used to form a structured surface on the tool roll that is the negative of the structured surface to be formed on the articles processed using the tool roll. In one embodiment, at least one of the ribbons wound around the cylindrical base may include discrete depressions or holes formed therein that, when wound in helical coils about the base roll, form mold cavities on the outer surface of the tool roll.

Mold cavities formed by depressions or holes according to the present invention may be formed with depths that may extend from the outer face through all or a portion of the thickness of the ribbons. The mold cavities are generally present within an outer face of the ribbon.

Filling of mold cavities that go through the ribbon (e.g. holes) may be enhanced by bleed structures on the ribbons and/or the base roll. Those bleed structures assist in the escape of air from the mold cavities during molding.

Another advantage of tool rolls according to the present invention is that one or more holes or depressions in a major side of the ribbon may be combined with holes or voids formed on the opposite major side of the ribbon to form a composite mold cavity having a shape that is not possible with a single hole or depression alone.

Other advantages of the tool rolls include, but are not limited to, the ability to replace the ribbon windings on the cylindrical base if the outer surface of the tool roll becomes damaged or worn. The tool rolls may also be relatively inexpensive as compared to the cost of manufacturing tool rolls using, e.g., stacked plates or direct drilling of the mold surface.

Yet another advantage of the present invention is the relatively small thermal mass of the ribbon or ribbons wrapped around the cylindrical base in comparison to the thermal mass of the cylindrical base, particularly a cylindrical base roll. As a result, thermal control over the mold cavities can be improved, which can result in corresponding improvements in the uniformity of the products produced using the tool rolls.

As used in connection with the present invention, a "mold cavity" may be any discontinuity in an otherwise smooth or planar surface into which moldable material may flow during a molding process. In some embodiments of the present invention, the tool rolls may include mold cavities with high aspect ratios as defined below, although it should be understood that a mold cavity need not have a high aspect ratio.

In one aspect, the present invention provides a tool roll with a cylindrical base and a first ribbon having an inner face, an outer face, and first and second major sides located therebetween. The outer face of the first ribbon includes a plurality of depressions or holes formed therein and the first ribbon is wound in helical coils around the base roll such that the inner face is proximate the base roll. The plurality of depressions or holes in the outer face of the first ribbon form a plurality of discrete mold cavities with each of the discrete mold cavities including a mold opening at the outer face of the first ribbon.

In another aspect, the present invention provides a tool roll including a cylindrical base and a first ribbon with an inner face, an outer face, and first and second major sides located therebetween. The outer face of the first ribbon includes a plurality of depressions or holes formed therein and the first ribbon is wound in helical coils around the cylindrical base such that the inner face is proximate the cylindrical base. The plurality of depressions or holes in the outer face of the first ribbon form a plurality of discrete mold cavities with each of the mold cavities including a mold opening at the outer face of the first ribbon. The tool roll also includes a second ribbon or wire with an inner face, outer face, and first and second major sides located therebetween. The second ribbon or wire is wound in helical coils around the cylindrical base such that the inner face of the second ribbon or wire is proximate the cylindrical base, wherein the second ribbon or wire is located between adjacent helical coils of the first ribbon. The sides and/or inner face of the second ribbon can include a bleed structure formed therein and a face zone free of the bleed structure.

In another aspect, the present invention provides a tool roll including a cylindrical base and a first ribbon with an inner face, outer face, and first and second major sides located therebetween. The ribbon is wound in helical coils around the base such that the inner face is proximate the base. The first ribbon also includes a plurality of through-holes formed through the outer face to the inner face of the ribbon, wherein each of the holes can include one or more depression extending therefrom. The plurality of holes with depressions extending therefrom form a plurality of composite mold cavities with each of the composite mold cavities having a mold opening at the outer face of the ribbon.

In another aspect, the present invention provides a tool roll including a cylindrical base and a first ribbon with an inner face, outer face, and first and second major sides located therebetween. The ribbon is wound in helical coils around the base roll such that the inner face is proximate the base. The first ribbon also includes a plurality of depressions formed in the outer face of the first ribbon and a plurality of holes formed through the outer face to the inner face of the ribbon, wherein each of the holes can include one or more depression or secondary holes extending therefrom. The plurality of depressions and holes with depressions extending therefrom form a plurality of composite mold cavities with each of the composite mold cavities having a mold opening at the outer face of the ribbon.

In another aspect, the present invention provides a method of forming a structured surface on an article, the method including providing a tool roll according to the present invention, contacting a moldable material to the outer surface of the tool roll to form the structured surface using the outer surface of the tool roll, wherein the moldable material at least partially fills at least some of the mold cavities or composite mold cavities; and removing the structured surface from the outer surface of the tool roll, wherein the structured surface includes a plurality of protrusions corresponding to the plurality of mold cavities or composite mold cavities.

DETAILED DESCRIPTION OF THE INVENTION

The present invention provides tool rolls and methods of using the tool rolls to manufacture articles with one or more structured surfaces. The tool rolls include an outer surface that, when used in connection with materials of the proper viscosity or formability, can form a structured surface on an article. Because the tools are manufactured in roll-form, they can be advantageously used in continuous manufacturing processes to form e.g., films, sheets, etc. Alternatively, discrete articles may be processed using the tool rolls of the present invention, which could be used as embossing rolls or the like.

The tool rolls of the present invention may include mold cavities in their outer surfaces that, when used in connection with materials of the proper viscosity or formability, can form protrusions or structures on at least one surface of a film. The protrusions or structures could be discrete or interconnected. Alternatively, two such rolls can be used in combination to form a film in which both major surfaces exhibit protrusions or structures.

Figure 1:
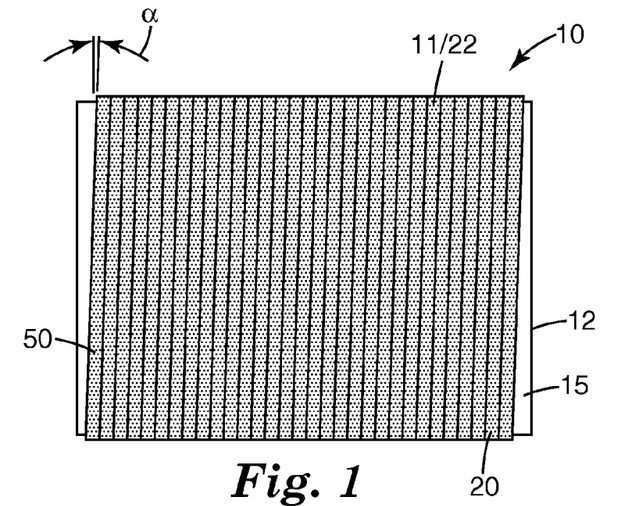
FIG. 1 is a perspective view of a helical wound ribbon on a tool roll.
Figure 2:
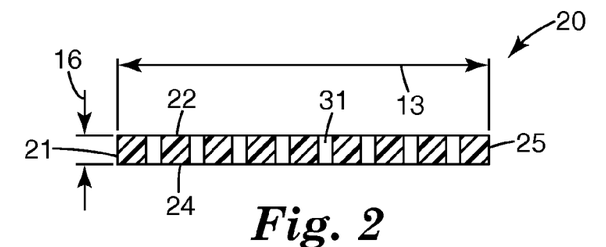
FIG. 2 is a cross sectional view of a ribbon with holes.

FIGS. 1-3 depict illustrative embodiments of a tool roll 10 according to the present invention including discrete mold cavities 30 opening into an outer face 22 surface 11 of the tool roll 10. FIG. 2 is a cross sectional view of one embodiment of the ribbon 20 of the tool roll 10 of FIG. 1. The tool roll 10 preferably includes a cylindrical base roll 12 around which one or more ribbons 20 are wrapped in the shape of a helical coil to produce an outer face 22 surface 11 having mold cavities 30 formed therein. The ribbon 20 will generally have a width 13 of from 1 mm to 125 mm or preferably 6 mm to 25 mm. The width of the ribbon 20 should be sufficient to form the desired mold cavities on the mold outer face surface 11 but not so wide that the ribbon 20 can not be helically wound about the base roll 12. The width of the ribbon 20 may also be characterized by a ratio of the width 13 to the thickness 16 of the ribbon 20. The minimum ratio may be 2, more preferably 4, most preferably 8. The maximum ratio may be 1000, more preferably 500, most preferably 100. The ribbon can also be characterized by ribbon width to roll diameter ratio (which serves as a measure of relative force for winding the ribbon around the roll) of 0.003 to 0.1. The thickness 16 of the ribbon 20 is generally 0.1 mm to 5.0 mm.

The ribbon or ribbons 20 wrapped around the base roll 12 may be held in place by any suitable mechanism, including, but not limited to clamps, welding, adhesives, etc. Such techniques are known in the production of, e.g., carding rolls. See, e.g., U.S. Pat. No. 4,272,865 (Schmolke). In an alternative embodiment, the ribbon may be wrapped around a cylindrical shell or tube so as to form a sleeve which could then be slipped over a base roll.

One preferred application in which tool rolls manufactured according to the present invention, such as tool roll 10, may be used is in the production of high aspect topology structured surfaces or protrusions, preferably film structures with structured surfaces or protrusions. The protrusions are a negative of the mold cavities from which they are formed and are generally discrete protrusions formed from discrete mold cavities. The protrusions may have a high aspect ratio and the tool rolls according to the present invention may be particularly advantageous in the manufacturing of structured surfaces with high aspect ratio topologies. By "high aspect ratio" it is meant that the ratio of protrusion height to minimum width (h':w') at the base of the protrusion is, e.g., at least about 2:1 or higher, more preferably about 3:1 or higher, and even more preferably at least about 4:1 or higher. These ratios could also be expressed as ratio of the depth of a mold cavity to its width at the outer face of the roll tool. (d':w'). In addition to, or in place of, high aspect ratio as defined above, it may be preferred that the protrusion or structure height h' (or mold cavity depth) above the major surface of the article be, e.g., about 0.1 millimeters or more, more preferably about 0.2 millimeters or more, and even more preferably about 0.4 millimeters or more.

Although the articles that can be produced by tool rolls and methods of the present invention are advantageously used as mechanical fasteners, the articles may find a variety of other uses and the tool rolls and methods of using the tool rolls to manufacture articles with structured surfaces according to the present invention should not be limited to the field of mechanical fasteners. For example, the protrusions or structures formed on the structured surface of an article such as a film according to the present invention may provide advantages in retaining adhesives or other coatings/materials by, e.g., increasing the surface area of the film. The structured surfaces formed by the invention tool rolls may also be useful for decorative purposes, as flow channels, drag reduction structures, abrasive backings, etc. Exemplary alternative structured surfaces which may be provided on a ribbon, so as to provide structured articles for various uses, are presented in FIGS. 8-12.

The helical nature of the wrapped ribbons is illustrated in FIG. 1. The coils are preferably oriented at a helix angle α (alpha) relative to a reference line that is normal to the surface of the cylindrical tool roll 10. As a result of the helical nature of the wrapped ribbons 20, they progress across the surface of the cylindrical tool 10 from one end to the opposite end. The helix angle is generally dictated by the width 13 of the ribbon 20 (where the ribbon 20 is laid flat against the cylindrical roll tool 10), in combination with the diameter of the cylindrical tool 10. The helix angle α (alpha) may be at least 0.1 degrees, alternatively at least 0.2 degrees, alternatively at least 0.4 degrees. The helix angle may be a maximum of 8 degrees, alternatively a maximum of 4 degrees, alternatively a maximum of 2 degrees. Other (larger or smaller) helix angles may be contemplated, although larger helix angles are sometimes difficult to obtain while maintaining full contact of the ribbon 20 with the base roll tool surface 15, and may require higher tensile strength ribbon materials.

The illustrated cylindrical tool 10 is manufactured using a cylindrical base roll 12 with an outer surface 15 around which is provided a continuous ribbon 20 including depressions 32 or holes 31 which form the mold cavities 30. There are typically more than one (e.g. 2 or more) rows of holes or depressions provided in the width 13 and/or length dimension of the ribbon to allow for easy manufacturability of the roll tool 10. The result is that ribbon 20 with depressions 32 or holes 31 is disposed over the surface 15 of the tool roll 10. Referring to FIGS. 1 and 2, the inner face 24 of the ribbon 20 is wrapped around the base roll 12 while the outer face 22 of the ribbon 20 is wound facing outward from the base roll 12 surface 15. The ribbon 20 may preferably have rectangular cross-sections (as illustrated in FIG. 2) compatible with an even progression of the helical coils across the base roll 10.

The ribbon 20 includes two major sides extending between the inner face 24 and the outer face 22 of the ribbon 20. Although the ribbon 20 includes generally flat major sides 21 and 25, the major sides of ribbons used in connection with the present invention may take any suitable form, but opposing sides are preferably mating or mirror images of each other when the ribbon 20 is wound by itself.

As used herein, the term "depression" is defined as a variation in a surface of the outer face 22 such that if the outer face 22 surface with the depression formed therein were placed against a complementary roll surface without a depression, the depression can form a connected or non-discrete mold cavity. Depressions can also be used to form discrete mold cavities For example, a depression may be a discrete or continuous void or divot formed in the outer face 22 surface 11 by displacing and/or removing material such that the thickness of the ribbon varies. Depressions as used herein in the description of the present invention generally do not extend through to the opposing inner face 24 of the ribbon unless connected to a hole. A "hole" as used herein in the description of the present invention is a void passage that extends from the ribbon outer face 22 to the ribbon inner face 24, which may extend from or to a larger depression and/or have one or more depressions extending into the hole. Holes generally form discrete mold cavities, but can have irregular or oblong shapes and extend along the length or width of the ribbon.

Figure 3A:
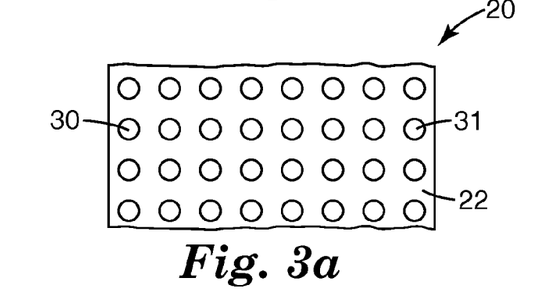
FIG. 3a is a top view of a ribbon with an array of mold cavities in the form of holes.
Figure 3B:
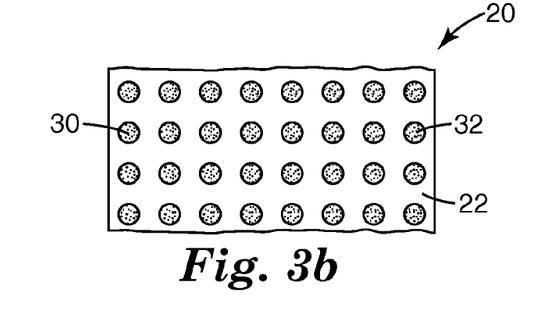
FIG. 3b is a top view of a ribbon with an array of mold cavities in the form of depressions.

Although depicted in FIGS. 3a and 3b as having discrete holes 31 or depressions 32 formed on outer face 22 of ribbon 20, the present invention may further include ribbons 20 having holes or depressions formed in both the outer face 22 and the inner face 24. If holes or depressions are formed on inner face 24 they are generally connected to holes or depressions formed on outer face 22 so that a continuous mold cavity 30 is formed. It may be preferred, but not required, that each of the holes 31 or depressions 32 be of the same size and be evenly-spaced along the length of the ribbon 20 to provide uniformity in the size and spacing of the resultant mold cavities 30. However, it is also possible to provide holes or depressions that vary in size and/or spacing, as exemplified by the large holes 31a and small holes 31b shown in FIG. 3e. Holes or depressions may have any desired shape, for example round, square, or elongated (as in the elongated depressions 63 shown in FIG. 3f). Holes or depressions (e.g. "cavity") features may also be combined with protruding features. In a particular useful embodiment, an elongated depression may be positioned adjacent to an elongated protruding feature (e.g. a ridge), which may serve to provide a weak region which might serve to impart the ability for the formed article to be torn along the line established by these features.

Figure 3C:
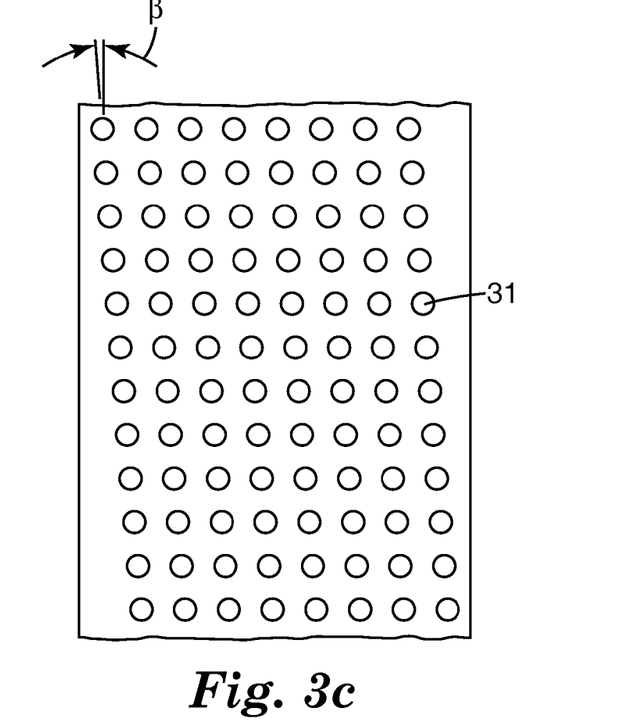
FIG. 3c is a top view of a ribbon with an array of holes aligned at an angle to the major axes of the ribbon.
Figure 3D:
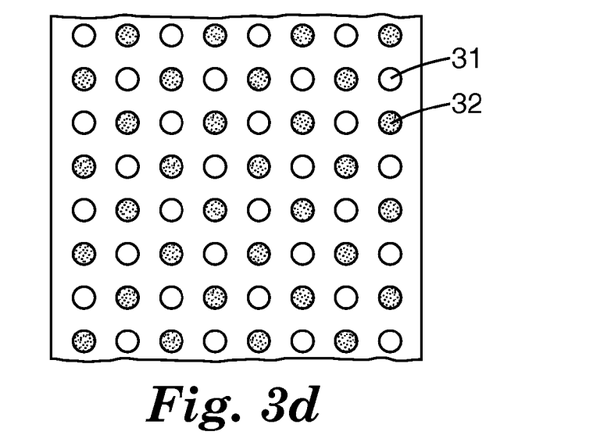
FIG. 3d is a top view of a ribbon with an array of holes and depressions.
Figure 3E:
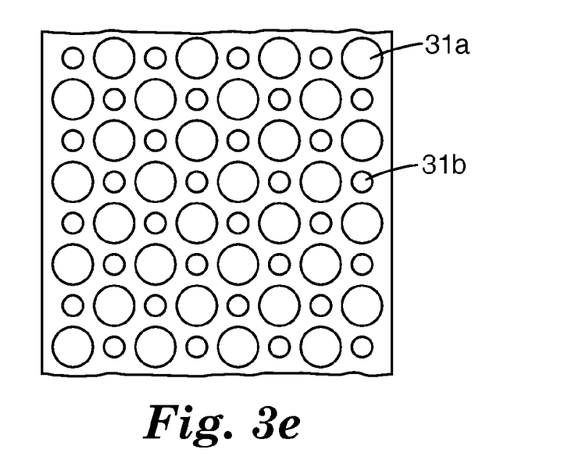
FIG. 3e is a top view of a ribbon with an array of large and small holes.
Figure 3F:
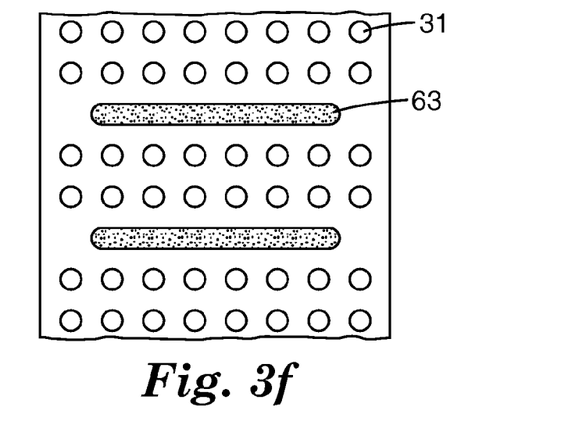
FIG. 3f is a top view of a ribbon with elongated depressions interspersed among an array of holes.

The mold cavities (holes, depressions and the like), are typically provided in an array which comprises a multiplicity of discrete mold cavities. In the embodiments of FIGS. 3a, 3b, and 3d, the discrete mold cavities are present in a regular array which is oriented along the major axes of the ribbon. In an alternative embodiment, the array of discrete mold cavities can be present at an angle β (beta) to the major axes of the ribbon, as shown in FIG. 3c. In a particular embodiment, the mold cavity array can be aligned at an angle β (beta) which is equal in magnitude, but opposite in orientation, to the helical angle α (alpha) at which the ribbon is present on the tool roll. The two angles will thus offset with the mold cavities being present in an array which is aligned with the major axes of the tool roll 10. The result is that the features formed (for example, stems, hooks, and the like) in the final product will be present in an array which is aligned with the major axes of the final product. It is also possible to provide the mold cavities in an irregular or random pattern rather than in a regular array.

Figure 6:
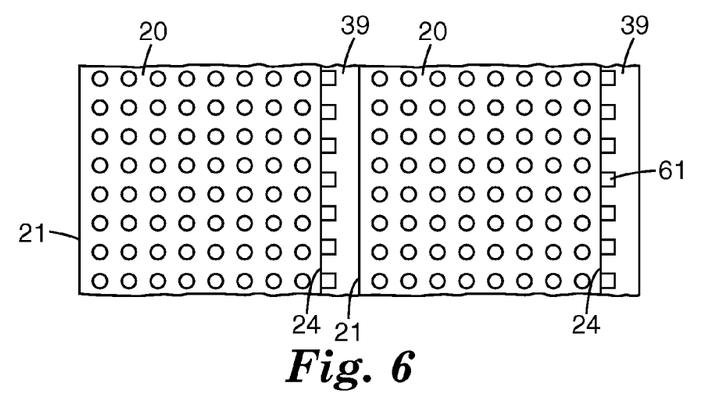
FIG. 6 is top view of two sections of a helically wrapped ribbon containing round holes, and two sections of spacer wire containing square edge notches.

Generally the outer face 22 of the coils of ribbon 20 is even across the roll tool however it is possible that a spacer wire or ribbon 39 is provided between the first and second major sides 21 and 24 of adjacent ribbon windings, as shown in FIG. 6. If this spacer wire or ribbon is the same height as ribbon 20 the finished tool roll 10 would be substantially smooth, i.e., without significant discontinuities between the spacer wire and the ribbon 20. However a spacer wire could be thinner or thicker that the ribbon 20 so that it is provided at a different height than the ribbon 20, which would impart a structure to the surface of the article being manufactured. That structure may be in the form of elongated ridges that may provide reinforcement to, e.g., taller ridge like protrusions or alternatively lines of weakness a ridge in the form or a trough in the finished article. In a particular embodiment, shown in FIG. 6, the spacer wire 39 may have edge notches therein, which, when the spacer wire is wound against edge 24 of the ribbon 20, serves to provide mold cavities 61. Such mold cavities may be of different size and shape than cavities provided by holes or depressions in the ribbon, as illustrated in FIG. 6.

The ribbon 20, including depressions 32 or holes 31 formed therein provide the desired mold cavities 30 when wound around the base roll 12. As discussed above, the roll tool 10 may preferably be manufactured using a ribbon or strip having a generally rectangular cross-section. Ribbon 20 may be manufactured with the depressions 32 or holes 31 or a ribbon with a substantially uniform profile may first be manufactured and then processed by any suitable technique or techniques to form the depressions 32 or holes 31 therein. The suitable technique or techniques may include, but not limited to knurling, stamping, embossing, engraving, conventional machining, drilling, laser machining, electronic discharge machining, water jet machining, etching, photolithography, etc. Such methods may also be used to form other structured surfaces, for example such structures exemplified in FIGS. 8-14, as is known in the art. The ribbon 20 may be manufactured from any suitable material or materials, although some preferred materials include steels, more preferably medium to low carbon steels.

The discrete mold cavities 30 so provided can have substantially uniform cross-sectional areas along their depth from the opening at the surface 22 of the tool roll 10 to the mold cavity bottoms at the ribbon inner face 24. The mold cavity bottoms are formed by the mold cavity 30 and an outer surface 15 of the cylindrical base roll 12. The mold cavities 30 may exhibit any suitable cross-sectional areas along their depths d. The illustrated discrete mold cavities 30 are also oriented substantially along the radius of the roll 10, although various orientations are possible as discussed below.

Figure 7A:
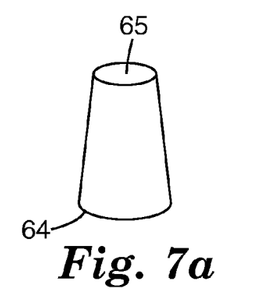
FIGS. 7a-7e are perspective views depicting various mold cavities which may be provided by means of using holes or depressions of various designs.
Figure 7B:
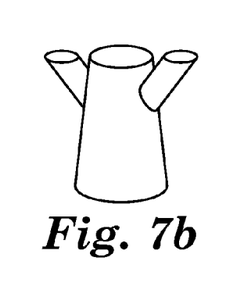
Figure 7C:
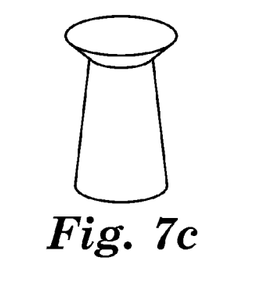
Figure 7D:
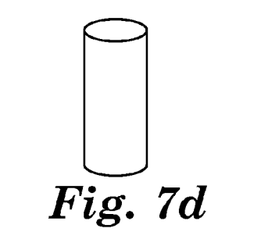
Figure 7E:
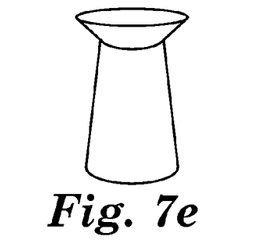
Figure 8:
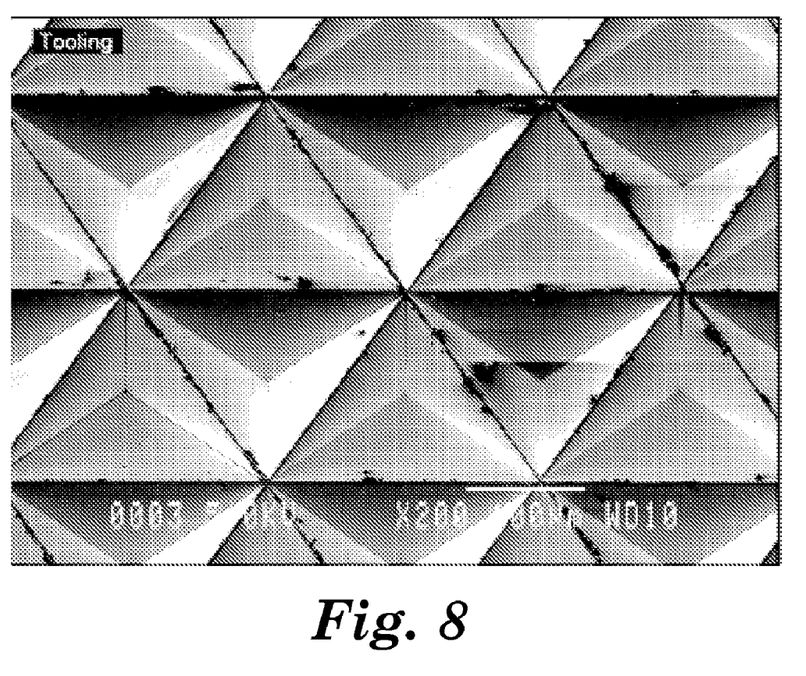
FIGS. 8-10 are SEM micrographs showing various structured surfaces which may be used on a ribbon of the present invention.
Figure 9:
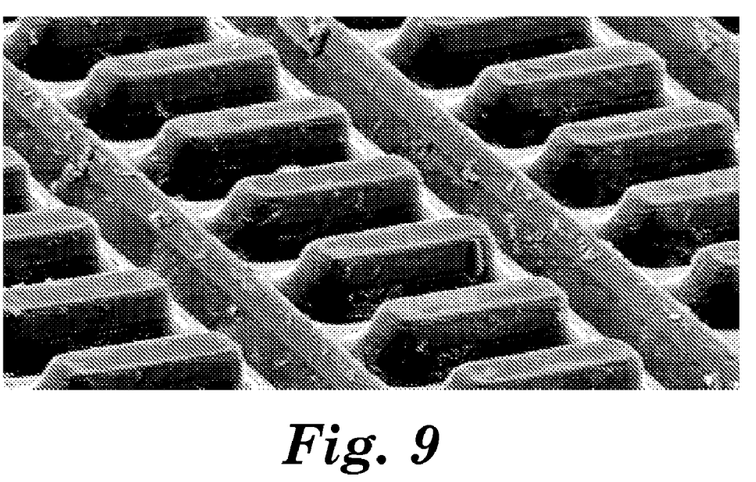
Figure 10:
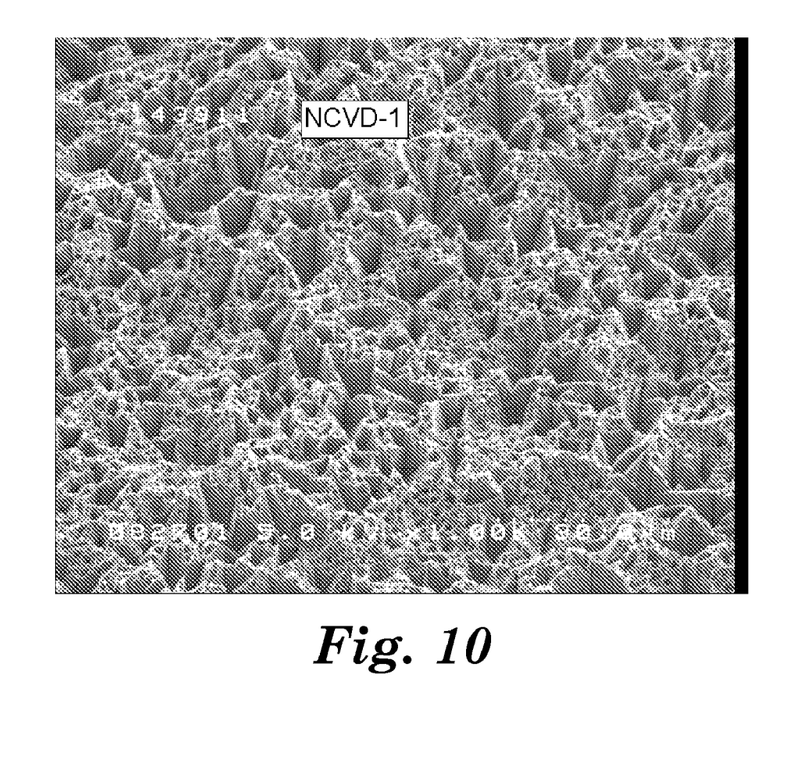
Figure 11:
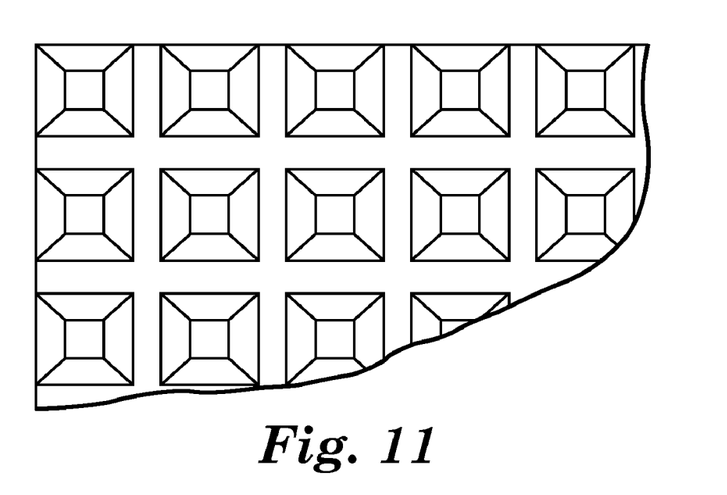
FIGS. 11-14 are drawings illustrating various structured surfaces which may be used on a ribbon of the present invention.
Figure 12:
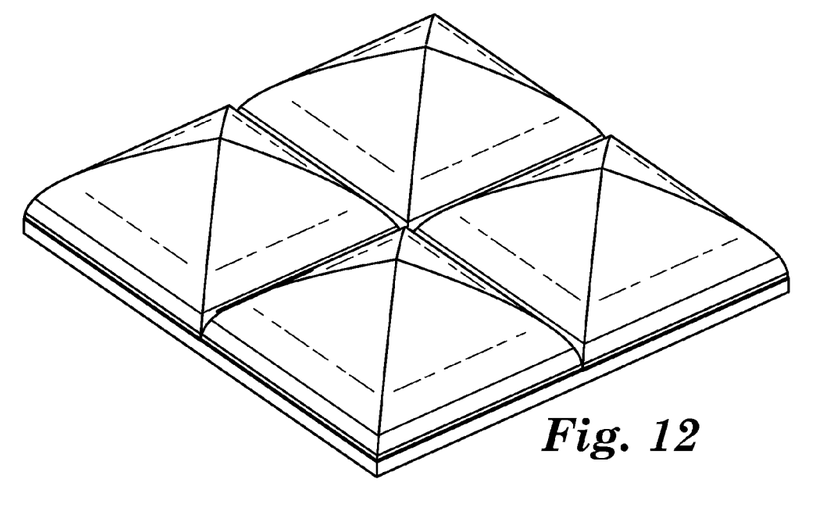
Figure 13:
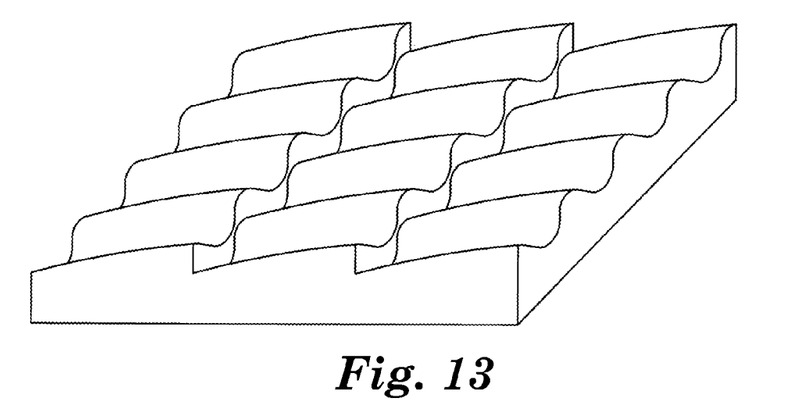
Figure 14:
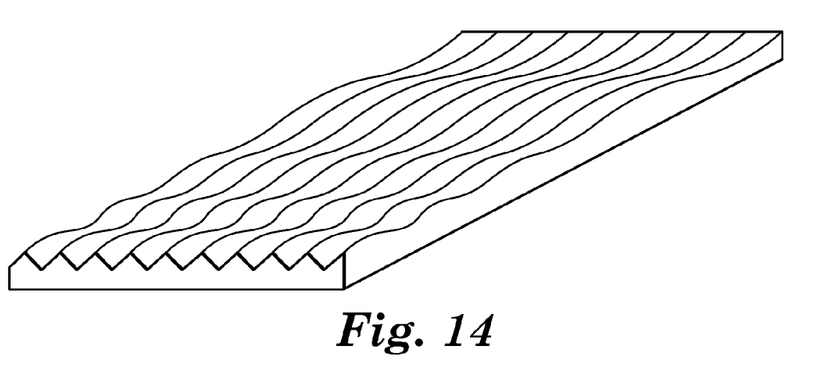

If it is desired to form discrete mold cavities having non-uniform shapes, e.g., the cavities are formed in the shape of hook or other structure, the "bottom" of the mold cavity, as generally defined by the portion of the mold cavity that is closest to the outer surface of the cylindrical base roll, has an enlarged section 64 as shown in the mold cavity 65 of in FIG. 7a. This enlarged section of the mold cavity can be formed for example by a combination of techniques such as forming holes, of a given cross sectional area, that connect with larger cross sectional area depressions formed on the inner face 24 of the ribbon 20. Although the bottoms of the various illustrative mold cavities are preferably formed by the base roll, it should be understood that the depressions may terminate above the surface of the base roll, such that the bottom of the mold cavity is formed within the surface in which the depression is formed. Several illustrative mold cavity shapes are illustrated in FIGS. 7b-7e.

Tool rolls manufactured according to the present invention may include a density of at least 30 discrete mold cavities per $cm^2$ or more over at least a portion of the roll tool. It may be preferred that the tool roll 10 include a density of at least 100 discrete mold cavities per $cm^2$ or more. It may be more preferred that the tool roll 10 include a density of at least 500 discrete mold cavities per $cm^2$ or more.

The size of discrete mold cavity openings at the surface of the tool may be relatively small in relation to, e.g., the thickness of the ribbon. For example, the tangential cross-sectional area of discrete mold cavity openings may be 0.1 $cm^2$ or smaller, in some instances 0.02 $cm^2$ or smaller, or in some instances 0.01 $cm^2$ or smaller.

The preferred cylindrical base roll 12 is preferably precision formed to have a tightly controlled diameter (for example, to exhibit a maximum diameter variation of 0.03 mm). This, in combination with a tightly controlled height dimension h (e.g. thickness 16) in the ribbon 20, can provide mold cavities 30 with substantially uniform depths d as measured from the outer surface of the roll 10.

The mold cavities 30 can also be characterized in terms of aspect ratio. The aspect ratio of the mold cavities 30 will be determined based on the depth d as compared to the minimum width w of the mold cavities, where the minimum width w is measured in a plane tangential to the surface of the base roll 12 at the opening of the mold cavity. In other words, the aspect ratio of the mold cavities 30 is d:w and, where the tool roll 10 is to be used to manufacture articles having a structured surface with high aspect ratio topology, it may be preferred that the ratio d:w be, e.g., at least about 2:1 or higher, more preferably at least about 3:1 or higher, and even more preferably at least about 4:1 or higher. In addition to, or in place of, high aspect ratio as defined above, it may be preferred that the mold cavity depth d be, e.g., about 0.1 millimeters or more, more preferably about 0.2 millimeters or more, and even more preferably about 0.4 millimeters or more.

Another optional feature of the invention is the addition of a plating or other coating on the roll 10. The coating can be located over the entire outer surface of the tool roll 10, i.e., the areas between the mold cavities 30 as well as on the inner surface of the mold cavities 30. Alternatively, the coating could be located only on the outer surface of the roll 10 and absent from the inner surfaces of the mold cavities 30. In another alternative, the coating could be located only in the mold cavities 30 and not on the outer surface of the roll 10. In still another alternative, a first coating could be located in the mold cavities 30 and a second coating could be located on the outer surface of the tool roll 10.

A coating may be a combination of one or more materials intermixed or applied in successive layers. The material or materials used in coating 50 may vary depending on the desired physical properties. Some physical properties that may be desired include, but are not limited to increased wear resistance, controlled release characteristics, controlled surface roughness, bonding between adjacent ribbon windings, etc. Some preferred materials may be metal platings, more particularly an electroless nickel plating, chrome, etc.

Although the illustrated tool roll 10 is preferably provided using one ribbon 20 it will be understood that the tool roll 10 could be produced using two or more ribbons or a ribbon combined with a thin spacer wire as discussed previously.

One tool roll ribbon variation is depicted in FIG. 3a, which presents a top view of one ribbon in which discrete mold cavities 30 (in this instance, holes 31) extend over the entire surface of the ribbon with no zones without mold cavities. Another tool roll ribbon variation is depicted in FIG. 3b, which presents a top view of one ribbon in which discrete mold cavities 30 (in this instance, depressions 32) extend over the entire surface of the ribbon with no zones without mold cavities.

Figure 4:
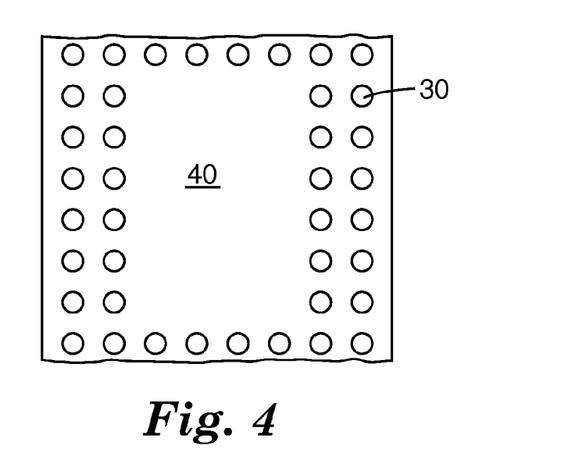
FIG. 4 is a top view of a ribbon with a cavity-less region interspersed among an array of mold cavities in the form of holes.

In an alternative embodiment, the roll tool ribbon of FIG. 4 has an area 40 extending along the longitudinal direction of the formed article (or along the radius of the roll tool) without mold cavities 30, which areas can be used to create attachment areas, fingerlifts or the like.

Figure 5:
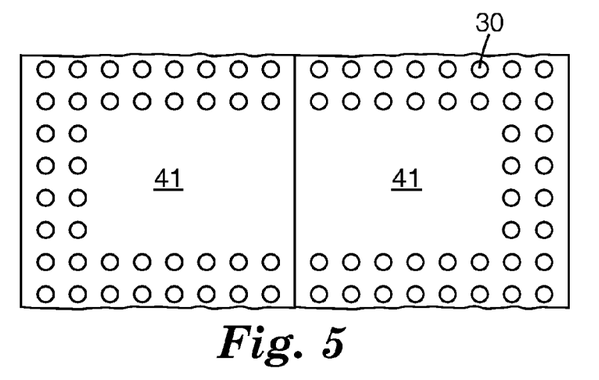
FIG. 5 is a top view of two adjacent sections of a helically wrapped ribbon, showing cavity-less regions in each section aligned so as to form a contiguous cavity-less region.

Another tool roll ribbon variation is depicted in FIG. 5, which presents a top view of two adjacent sections of a helically wound ribbon. In this instance the two ribbon sections each have an area 41 without mold cavities, arranged such that when helically wrapped the two cavity-less sections are positioned adjoining each other so as to provide a cavity-less section that is oriented in the transverse direction of the formed article. Such an area can again be used to create attachment areas, fingerlifts, or the like. This particular configuration is an exemplary embodiment of the general arrangement in which cavity-less areas are provided as discontinuous regions surrounded by continuous regions comprising cavities. In an alternative embodiment, regions with cavities can be present as discontinuous regions surrounded by continuous cavity-less regions. Such arrangements may be achieved by design of the structure or features imparted to the ribbon, such that when the ribbon is helically wrapped, the various regions bearing different structures (and/or no structures) combine to form the desired macroscopic pattern of areas with features as desired.

Although the depressions and holes illustrated in the above embodiments are depicted as symmetrical and repeating patterns, it should be understood that the depressions and holes used to form the mold cavities may be symmetrical or asymmetrical, random or repeating ordered or disordered or formed of single holes or depressions or composite mold cavities could be formed by two or more depressions and/or holes.

The present invention may also include bleed structures formed in a surface of the ribbon or ribbons used to form the mold cavities, generally the inner face surface of the ribbon or the outer face 15 of the base roll tool 12. The bleed structures may allow fluid (e.g., air) to more readily escape from the mold cavities, thereby enhancing filling of the cavities. The bleed structures may be particularly helpful when the mold cavities have higher aspect ratios that could otherwise be difficult to fill completely.

It may be preferred that the bleed structures occupy only a portion of the surface of the ribbon without holes and the hole themselves are preferably free of the bleed structure to prevent undesired filling of the bleed structure by the moldable material during processing.

In addition to (or in place of) bleed structures formed on the ribbon or ribbons wound around a base roll, the surface of the tool roll around which the ribbon or ribbons are wound may also include a bleed structure to assist in the removal of air or other fluids from the mold cavities during processing. The bleed structure on the surface of the base roll may be used alone (without bleed structures on the ribbons) where the mold cavities include bottoms that are formed by the outer surface of the base roll itself, thereby placing the mold cavities in fluid communication with the bleed structure on base roll. A bleed structure on the base roll could be in the form or a randomly roughened surface (formed by, e.g., etching, sandblasting, etc.). The bleed structure may extend over the entire surface of base roll or it may be provided in only selected areas.

An additional advantage that may be provided by a base roll including a bleed structure formed on its outer surface is that it may assist in holding ribbon in place around the cylindrical base roll by increasing frictional forces developed between the ribbon and the base roll.

The bleed structures used in connection with the present invention (on the ribbons or the base roll) may be formed using any suitable technique known in the art, e.g., knurling, stamping, embossing, engraving, conventional machining, laser machining, electronic discharge machining, water jet machining, etching, photolithography, etc. In general, a bleed structure according to the present invention may be formed by any suitable structure or surface treatment that can provide a path for fluid to move between two facing surfaces, e.g., channels, standoffs that create voids, roughened surfaces (formed by etching, sandblasting, etc.), and combinations thereof.

In the methods of manufacturing tool rolls according to the present invention, it may be desirable to machine the outer surface of the tool roll after winding the ribbons to provide improved control of the diameter of the finished tool roll.

It may also be desirable to remove any burrs remaining from, e.g., ribbon punching and/or machining of the wound roll, by blasting the roll with sodium bicarbonate (baking soda) or a similar material. The finished tool roll may also be processed to provide a desired surface finish within the mold cavities and/or on the outer surface of the tool roll between the mold cavities. For example, it may be desirable to chemically etch, sandblast, plate, coat or otherwise modify the surfaces of the tool roll.

One process in which a tool roll according to the present invention can be used is to form a high aspect topology film. A moldable material can be applied to the surface of the tool roll by, e.g., extrusion or cast molding to create a film including protrusions that are replicas of the mold cavities in the tool. In preferred embodiments, adhesion of the material to the tool roll is less than the cohesion within the material at the time of removal from the tool roll. It may be further preferred that the adhesion of the material to the tool roll not exceed the tensile strength of the ribbon or ribbons used to form the tool roll.

Substantially any moldable material may be used in connection with the present invention. It may be preferred that the moldable material be an orientable thermoplastic resin. Orientable thermoplastic resins that can be extrusion molded and should be useful include polyesters such as poly (ethylene terephthalate), polyamides such as nylon, poly (styrene-acrylonitrile), poly (acrylonitrile-butadiene-styrene), polyolefins such as polypropylene, and plasticized polyvinyl chloride. One preferred thermoplastic resin is an impact copolymer of polypropylene and polyethylene containing 17.5% polyethylene and having a melt flow index of 30, that is available as SRD7-587 from Union Carbide, Danbury, Conn. The thermoplastic resin may also comprise blends, including polyethylene and polypropylene blends, co-polymers, such as polypropylene-polyethylene co-polymers, or coextruded as multiple layers or in alternating zones. Additives such as plasticizers, fillers, pigments, dyes, anti-oxidants, release agents, and the like may also be incorporated into the moldable material.

In one preferred process, the material is provided by extrusion into a nip formed by the tool roll and a backup roll as illustrated in U.S. Pat. No. 6,902,389 the substance of which is incorporated by reference in its entirety. The backup roll preferably provides some pressure to assist in forcing the moldable material into the mold cavities provided in the tool roll. Alternatively, the backup roll may be replaced by any continuously moving surface that can assist in forcing the mold material into the mold cavities in the tool roll, or by a nonmoving surface (e.g. doctor blade).

The interior of the tool roll may be supplied with a vacuum to assist in removal of air that may otherwise interfere with complete filling of the mold cavities. However, in many instances, no vacuum may be supplied as the air within the mold cavities escapes between the ribbons used to manufacture the tool roll. In other words, the process may be performed in the absence of a vacuum.

It may also be desirable to provide some thermal control in either or both of the tool roll and the backup roll. Depending on process conditions, temperatures of the moldable material, properties of the moldable material, etc. it may be desirable to either heat one or both of the rolls, cool one or both of the rolls, or heat one of the rolls and cool the other roll.

After the material is forced within the mold cavities in the tool roll and has sufficiently cooled to form a film with protrusions that can maintain the desired shape or shapes, it is stripped from the tool roll for further processing or the film can be wound into rolls. For example, if mechanical fastener strips are desired, the film may be directed into a station or stations to modify the protrusions, coat adhesives, and perform other processing as discussed in, e.g., U.S. Pat. Nos. 5,845,375 (Miller et al.), 5,077,870 (Melbye et al.), PCT Publication Nos. WO 98/57565; WO 98/57564; WO 98/30381; and WO 98/14086. It may be desirable to direct one or more additional materials into the nip formed by the tool roll and backup roll to provide desired additional properties to the film. For example, a woven or nonwoven web may be directed into the nip. Alternatively, the film may be laminated to one or more additional layers by, e.g., heat, adhesives, coextrusion, etc.

Another optional feature that may be incorporated into a backup roll is the addition of some structure to the surface of the roll to increase its surface area. The increased surface area on the backup roll can increase the surface area on the film, thereby improving adhesion of any adhesives provided on the back side of the film. One example of useful structure could be a micro-embossed pattern of linear prisms on the scale of about 400 lines per inch (160 lines per centimeter).

All patents, patent applications, and publications cited herein are each incorporated herein by reference in their entirety, as if individually incorporated by reference. All numbers are assumed to be modified by the term 'about'. Various modifications and alterations of this invention will become apparent to those skilled in the art without departing from the scope of this invention, and it should be understood that this invention is not to be unduly limited to the illustrative embodiments set forth herein.

What is claimed is:

1. A tool roll comprising:
    a cylindrical base;
    a first ribbon wound helically around the cylindrical base and attached thereto, the first ribbon having a first outward face and a second inward face and two side faces, the first ribbon further having a width between the two side faces and a thickness between the first outward face and the second inward face where the ratio of the ribbon width to the ribbon thickness is at least 2,
    the first outward face having a plurality of depressions or holes that are located between, but do not include, the two side faces, and the second inward face facing the cylindrical base.

2. The tool roll of claim 1 wherein the ratio of the width to the thickness of the ribbon is less than 1000.

3. The tool roll of claim 2 wherein the ratio of the width to the thickness of the ribbon is from 4 to 500.

4. The tool roll of claim 2 wherein the ratio of the width to the thickness of the ribbon is from 8 to 100.

5. The tool roll of claim 2 wherein the width of the ribbon is from 1 to 125 mm.

6. The tool roll of claim 5 wherein the width of the ribbon is from 6 to 25 mm.

7. The tool roll of claim 5 wherein the thickness of the ribbon is from 0.1 to 5 mm.

8. The tool roll of claim 5 wherein the ribbon is wrapped such that the ribbon is oriented at a helix angle of less than 8 degrees.

9. The tool roll of claim 5 wherein the ribbon is wrapped such that the ribbon is oriented at a helix angle of less than 2 degrees.

10. The tool roll of claim 1 wherein the ribbon has discrete depressions or holes on at least the ribbon first lace forming discrete mold cavities on the ribbon first lace.

11. The tool roll of claim 10 wherein the ribbon has more than one row of discrete mold cavities across the width of the ribbon.

12. The tool roll of claim 10 wherein the ribbon discrete mold cavities define high aspect ratio projections and have a ratio of depth to width of greater than 2:1.

13. The tool roll of claim 10 wherein the ribbon discrete mold cavities define high aspect ratio projections and have a ratio of depth to width of greater than 3:1.

14. The tool roll of claim 10 wherein the ribbon discrete mold cavities define high aspect ratio projections and have a ratio of depth to width of greater than 4:1.

15. The tool roll of claim 12 wherein the discrete mold cavities depth is 0.1 mm or more.

16. The tool roll of claim 12 wherein the discrete mold cavities depth is 0.2 mm or more.

17. The tool roll of claim 12 wherein the discrete mold cavities depth is 0.4 mm or more.

18. The tool roll of claim 1 wherein the first ribbon is wound with an adjacent second spacer wire or ribbon.

19. The tool roll of claim 18 wherein the adjacent second spacer wire or ribbon has a different thickness than the first ribbon.

20. The tool roll of claim 10 wherein the discrete mold cavities are of generally non-uniform shapes.

21. The tool roll of claim 20 wherein the discrete mold cavities have the shape of a mechanical fastener hook.

22. The tool roll of claim 20 wherein the discrete mold cavities are provided at a density of at least 30 discrete mold cavities per $cm^2$ over at least a portion of the tool roll.

23. The tool roll of claim 20 wherein the discrete mold cavities are provided at a density of at least 100 discrete mold cavities per $cm^2$ over at least a portion of the tool roll.

24. The tool roll of claim 20 wherein the discrete mold cavities are provided at a density of at least 500 discrete mold cavities per $cm^2$ over at least a portion of the tool roll.

* * * * *

UNITED STATES PATENT AND TRADEMARK OFFICE
CERTIFICATE OF CORRECTION

PATENT NO. : 7,645,134 B2  Page 1 of 1
APPLICATION NO. : 11/612739
DATED : January 12, 2010
INVENTOR(S) : Ronald W. Ausen

It is certified that error appears in the above-identified patent and that said Letters Patent is hereby corrected as shown below:

Column 12
Line 57, in Claim 10, delete "lace" and insert -- face --, therefor.

Line 58, in Claim 10, delete "lace" and insert -- face --, therefor.

Signed and Sealed this

Twenty-third Day of March, 2010

David J. Kappos
*Director of the United States Patent and Trademark Office*